(12) United States Patent
Homayounfar et al.

(10) Patent No.: US 11,734,828 B2
(45) Date of Patent: *Aug. 22, 2023

(54) HIGH QUALITY INSTANCE SEGMENTATION

(71) Applicant: UATC, LLC, Mountain View, CA (US)

(72) Inventors: Namdar Homayounfar, Toronto (CA); Yuwen Xiong, Toronto (CA); Justin Liang, Toronto (CA); Wei-Chiu Ma, Toronto (CA); Raquel Urtasun, Toronto (CA)

(73) Assignee: UATC, LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/878,408

(22) Filed: Aug. 1, 2022

(65) Prior Publication Data

US 2022/0383505 A1 Dec. 1, 2022

Related U.S. Application Data

(63) Continuation of application No. 17/017,104, filed on Sep. 10, 2020, now Pat. No. 11,410,315.
(Continued)

(51) Int. Cl.
*G06T 7/11* (2017.01)
*G06T 7/73* (2017.01)
(Continued)

(52) U.S. Cl.
CPC .............. *G06T 7/11* (2017.01); *G06F 18/213* (2023.01); *G06F 18/24* (2023.01); *G06T 7/73* (2017.01);
(Continued)

(58) Field of Classification Search
CPC ... G06T 7/11; G06T 7/73; G06T 7/149; G06T 2207/20084; G06T 2207/30252;
(Continued)

(56) References Cited

U.S. PATENT DOCUMENTS 11,170,224 B2 11/2021 Cambias et al.
11,410,315 B2* 8/2022 Homayounfar ...... G06V 10/764
(Continued)

OTHER PUBLICATIONS

Acuna et al., "Efficient Interactive Annotation of Segmentation Datasets with Polygon-RNN++", Conference on Computer Vision and Pattern Recognition, Jun. 18-22, 2018, Salt Lake City, UT, pp. 859-868.
(Continued)

*Primary Examiner* — John B Strege
(74) *Attorney, Agent, or Firm* — Dority & Manning, P.A.

(57) ABSTRACT

Disclosed herein are methods and systems for performing instance segmentation that can provide improved estimation of object boundaries. Implementations can include a machine-learned segmentation model trained to estimate an initial object boundary based on a truncated signed distance function (TSDF) generated by the model. The model can also generate outputs for optimizing the TSDF over a series of iterations to produce a final TSDF that can be used to determine the segmentation mask.

20 Claims, 6 Drawing Sheets

Related U.S. Application Data

(60) Provisional application No. 63/024,847, filed on May 14, 2020, provisional application No. 62/936,448, filed on Nov. 16, 2019.

(51) Int. Cl.
  *G06V 10/77* (2022.01)
  *G06F 18/24* (2023.01)
  *G06F 18/213* (2023.01)
  *G06V 10/764* (2022.01)
  *G06V 10/82* (2022.01)
  *G06V 20/56* (2022.01)

(52) U.S. Cl.
  CPC ............ *G06V 10/764* (2022.01); *G06V 10/77* (2022.01); *G06V 10/7715* (2022.01); *G06V 10/82* (2022.01); *G06V 20/56* (2022.01)

(58) Field of Classification Search
  CPC ..... G06F 18/213; G06F 18/24; G06V 10/764; G06V 10/77; G06V 10/7715; G06V 10/82; G06V 20/56
  See application file for complete search history.

(56) References Cited

U.S. PATENT DOCUMENTS

| | | |
|---|---|---|
| 2019/0122365 A1 | 4/2019 | Farhangi et al. |
| 2020/0394433 A1 | 12/2020 | Zhao et al. |
| 2021/0150410 A1 | 5/2021 | Liang et al. |
| 2021/0150722 A1 | 5/2021 | Homayounfar et al. |
| 2021/0166426 A1 | 6/2021 | McCormac et al. |
| 2021/0216766 A1 | 7/2021 | Luo et al. |
| 2021/0334975 A1 | 10/2021 | Yang et al. |
| 2022/0076117 A1 | 3/2022 | Amon et al. |

OTHER PUBLICATIONS

Arnab et al., "Pixelwise Instance Segmentation with a Dynamically Instantiated Network", IEEE Conference on Computer Vision and Pattern Recognition, Honolulu, HI, USA, Jul. 21-26, 2017, pp. 441-450.

Bai et al., "Deep Watershed Transform for Instance Segmentation", IEEE Conference on Computer Vision and Pattern Recognition, Honolulu, HI, USA, Jul. 21-26, 2017, pp. 5221-5229.

Brabandere et al., "Semantic Instance Segmentation with a Discriminative Loss Function", arXiv:1708.02551v1, Aug. 8, 2017, 10 pages.

Bulo et al., "In-Place Activated BatchNorm for Memory-Optimized Training of DNNs", Conference on Computer Vision and Pattern Recognition, Jun. 18-22, 2018, Salt Lake City, UT, pp. 5639-5647.

Cai et al., "Cascade R-CNN: Delving into High Quality Object Detection", Conference on Computer Vision and Pattern Recognition, Jun. 18-22, 2018, Salt Lake City, UT, pp. 6154-6162.

Caselles et al., "Geodesic Active Contours", International Journal of Computer Vision, vol. 22, No. 1, Jul. 5, 1995, pp. 61-79.

Chan et al., "Active Contours Without Edges", IEEE Transactions on Image Processing, vol. 10, No. 2, Feb. 2011, pp. 266-277.

Chen et al., "Hybrid Task Cascade for Instance Segmentation", Conference on Computer Vision and Pattern Recognition, Jun. 16-20, 2019, Long Beach, CA, pp. 4974-4983.

Chen et al., "Learning Active Contour Models for Medical Image Segmentation", Conference on Computer Vision and Pattern Recognition, Jun. 16-20, 2019, Long Beach, CA, pp. 11632-11640.

Chen et al., "MaskLab: Instance Segmentation by Refining Object Detection with Semantic and Direction Features", arXiv:1712.04837v1, Dec. 13, 2017, 10 pages.

Chen et al., "TensorMask: A Foundation for Dense Object Segmentation", arXiv:1903.12174v2, Aug. 27, 2019, 12 pages.

Cheng et al., "DARNet: Deep Active Ray Network for Building Segmentation", Conference on Computer Vision and Pattern Recognition, Jun. 16-20, 2019, Long Beach, CA, pp. 7431-7439.

Cho et al., "Learning Phrase Representations using RNN Encoder-Decoder for Statistical Machine Translation", Conference on Empirical Methods in Natural Language Processing, Oct. 25-29, 2014, Doha, Qatar, pp. 1724-1734.

Cordts et al., "The Cityscapes Dataset for Semantic Urban Scene Understanding", Conference on Computer Vision and Pattern Recognition, Jun. 26-Jul. 1, 2016, Las Vegas, NV, pp. 3213-3223.

Cremers et al., "A Review of Statistical Approaches to Level Set Segmentation: Integrating Color, Texture, Motion and Shape", International Journal of Computer Vision, vol. 72, No. 2, 2007, pp. 195-215.

Dai et al., "Instance-aware Semantic Segmentation via Multi-task Network Cascades", IEEE Conference on Computer Vision and Pattern Recognition, Jun. 7-12, 2015, Boston, Ma, pp. 3150-3158.

Dervieux et al., "A Finite Element Method for the Simulation of a Rayleigh-Taylor Instability", Approximation Methods for Navier-Stokes Problems, Springer, 1980, pp. 145-158.

Fathi et al., "Semantic Instance Segmentation via Deep Metric Learning", arXiv:1703.10277v1, Mar. 30, 2017, 9 pages.

Fazeli et al., "See, Feel, Act: Hierarchical Learning for Complex Manipulation Skills with Multi-sensory Fusion", Science Robotics, vol. 4, No. 26, Jan. 30, 2019, 21 pages.

Fu et al., "RetinaMask: Learning to predict masks improves state-of-the-art single-shot detection for free", arXiv:1901.03353v1, Jan. 10, 2019, 11 pages.

Gao et al., "SSAP: Single-Shot Instance Segmentation With Affinity Pyramid", International Conference on Computer Vision, Oct. 27-Nov. 2, 2019, Seoul, Korea, pp. 642-651.

Girshick, "Fast R-CNN", IEEE International Conference on Computer Vision, Dec. 7-13, 2015, Santiago, Chile, pp. 1440-1448.

He et al., "Deep Residual Learning for Image Recognition", IEEE Conference on Computer Vision and Pattern Recognition, Jun. 7-12, 2015, Boston, MA, pp. 770-778.

He et al., "Mask R-CNN", International Conference on Computer Vision, Oct. 22-29, 2017, Venice, Italy, pp. 2961-2969.

Hu et al., "Deep Level Sets for Salient Object Detection", Conference on Computer Vision and Pattern Recognition, Jul. 21-26, 2017, Honolulu, HI, pp. 2300-2309.

Huang et al., "Mask Scoring R-CNN", Conference on Computer Vision and Pattern Recognition, Jun. 16-20, 2019, Long Beach, CA, pp. 6409-6418.

Kass et al., "Snakes: Active Contour Models", International Journal of Computer Vision, vol. 1, No. 4, 1998, pp. 321-331.

Kendall et al., "Multi-Task Learning Using Uncertainty to Weigh Losses for Scene Geometry and Semantics", Conference on Computer Vision and Pattern Recognition, Jun. 18-22, 2018, Salt Lake City, UT, pp. 7482-7491.

Kim et al., "Instance Segmentation and Object Detection with Bounding Shape Masks", arXiv:1810.10327v1, Oct. 15, 2018, 8 pages.

Kirillov et al., "InstanceCut: from Edges to Instances with MultiCut", Conference on Computer Vision and Pattern Recognition, Jul. 21-26, 2017, Honolulu, HI, pp. 5008-5017.

Kirillov et al., "Panoptic segmentation", Conference on Computer Vision and Pattern Recognition, Jul. 21-26, 2017, Honolulu, HI, pp. 9404-9413.

Kristiadi et al., "Deep Convolutional Level Set Method for Image", Journal of ICT Research & Applications, vol. 11, No. 3, 2017, pp. 284-298.

Krizhevsky et al., "ImageNet Classification with Deep Convolutional Neural Networks", Conference on Neural Information Processing Systems, Dec. 3-8, 2012, Lake Tahoe, NV, 9 pages.

Le et al., "Reformulating level sets as deep recurrent neural network approach to semantic segmentation", IEEE Transactions on Image Processing, vol. 27, No. 5, May 2018, pp. 2393-2407.

Li et al., "Fully Convolutional Instance-aware Semantic Segmentation", Conference on Computer Vision and Pattern Recognition, Jul. 21-26, 2017, Honolulu, HI, pp. 2359-2367.

Liang et al., "Proposal-free Network for Instance-level Object Segmentation", IEEE Transactions on Pattern Analysis and Machine Intelligence, vol. 40, No. 12, 2018, 14 pages.

(56) References Cited

OTHER PUBLICATIONS

Lin et al., "Feature Pyramid Networks for Object Detection", Conference on Computer Vision and Pattern Recognition, Jun. 26-Jul. 1, 2016, Las Vegas, NV, pp. 2117-2125.
Liu et al., "Affinity Derivation and Graph Merge for Instance Segmentation", arXiv:1811.10870v1, Nov. 27, 2018, 18 pages.
Liu et al., "Path Aggregation Network for Instance Segmentation", Conference on Computer Vision and Pattern Recognition, Jun. 18-22, 2018, Salt Lake City, UT, pp. 8759-8768.
Liu et al., "SGN: Sequential Grouping Networks for Instance Segmentation", 2017 International Conference on Computer Vision, Oct. 22-29, 2017, Venice, Italy, pp. 3496-3504.
Ma et al., "Deep Rigid Instance Scene Flow", Conference on Computer Vision and Pattern Recognition Jun. 16-20, 2019, Long Beach, CA, pp. 3614-3622.
Marcos et al., "Learning deep structured active contours end-to-end", Conference on Computer Vision and Pattern Recognition, Jun. 18-22, 2018, Salt Lake City, UT, pp. 8877-8885.
Neven et al., "Instance Segmentation by Jointly Optimizing Spatial Embeddings and Clustering Bandwidth", Conference on Computer Vision and Pattern Recognition Jun. 16-20, 2019, Long Beach, CA, pp. 8837-8845.
Newell et al., "Associative Embedding: End-to-End Learning for Joint Detection and Grouping", Conference on Neural Information Processing Systems, Dec. 4-9, 2017, Long Beach, CA, 11 pages.
Ng et al., "On Spectral Clustering: Analysis and an algorithm", Conference on Neural Information Processing Systems, Dec. 3-8, 2001, Vancouver, Canada, 8 pages.
Osher et al., "Fronts Propagating with Curvature Dependent Speed: Algorithms Based on Hamilton- Jacobi Formulations", Journal of Computational Physics, vol. 79, No. 1, 38 pages.
Perazzi et al., "A Benchmark Dataset and Evaluation Methodology for Video Object Segmentation", Conference on Computer Vision and Pattern Recognition, Jun. 26-Jul. 1, 2016, Las Vegas, NV, pp. 724-732.
Redmon et al., "You Only Look Once: Unified, Real-Time Object Detection", Jun. 7-12, 2015, Boston, MA, pp. 779-788.
Ren et al., "Faster R-CNN: Towards Real-Time Object Detection with Region Proposal Networks", Conference on Neural Information Processing Systems, Dec. 7-12, 2015, Montreal, Canada, 9 pages.
Shelhamer et al., "Fully Convolutional Networks for Semantic Segmentation", arXiv:1605.06211v1, May 20, 2016, 12 pages.
Sobel, "An Isotropic 3x3 Image Gradient Operator", Stanford Artificial Intelligence Project, 1968, 3 pages.
Sofiiuk et al., "AdaptIS: Adaptive Instance Selection Network", arXiv:1909.07829v1, Sep. 17, 2019, 11 pages.
Tang et al., "A Deep Level Set Method for Image Segmentation", arXiv:1705.06260v2, Oct. 24, 2017, 9 pages.
Uhrig et al., "Pixel-level Encoding and Depth Layering for Instance-level Semantic Labeling", arXiv:1604.05096v2, Jul. 14, 2016, 17 pages.
Xiong et al., "UPSNet: A Unified Panoptic Segmentation Network", arXiv:1901.03784v2, Apr. 3, 2019, 15 pages.
Xu et al., "Explicit Shape Encoding for Real-Time Instance Segmentation", International Conference on Computer Vision, Oct. 27-Nov. 2, 2019, Seoul, Korea, pp. 5168-5177.
Xu et al., "Gland Instance Segmentation Using Deep Multichannel Neural Networks", arXiv:1611.06661v2, Dec. 3, 2016, 27 pages.
Yang et al., "Video Instance Segmentation", International Conference on Computer Vision, Oct. 27-Nov. 2, 2019, Seoul, Korea, pp. 5188-5197.
Yao et al., "3D-Aware Scene Manipulation via Inverse Graphics", Conference on Neural Information Processing Systems, Dec. 7-12, 2015, Montreal, Canada, 12 pages.
Zhang et al., "Instance-Level Segmentation for Autonomous Driving with Deep Densely Connected MRFs", Conference on Computer Vision and Pattern Recognition, Jun. 26-Jul. 1, 2016, Las Vegas, NV, pp. 669-677.
Zhang et al., "Monocular Object Instance Segmentation and Depth Ordering with CNNs", International Conference on Computer Vision, Dec. 11-18, 2015, Santiago, Chile, pp. 2614-2622.

\* cited by examiner

HIGH QUALITY INSTANCE SEGMENTATION

PRIORITY CLAIM

This application is a continuation of U.S. application Ser. No. 17/017,104 having a filing date of Sep. 10, 2020, which claims priority to and the benefit of U.S. Provisional Patent Application No. 62/936,448, filed Nov. 16, 2019, and U.S. Provisional Patent Application No. 63/024,847, filed May 14, 2020. Applicant claims priority to and the benefit of each of such applications and incorporates all such applications herein by reference in its entirety.

FIELD

The present disclosure relates generally to computing systems and computer-implemented methods for generating improved segmentation masks.

BACKGROUND

Obtaining precise and high-quality instance segmentation masks is of high importance in many modern applications such as robotic manipulation and autonomous driving. Currently, most state-of-the-art models are based on the Mask R-CNN framework, which while very powerful, outputs masks at low resolutions. Low resolution masks can result in imprecise boundaries and irregularly disconnected regions in the mask.

On the other hand, energy based segmentation methods can impose desirable global and local data and geometry constraints on the segmentation process. However, the direct dependence of these methods on good initialization, non-robust image cues, and manual setting of hyperparameters renders them unsuitable for modern applications.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating instance segmentation masks for objects depicted in images. The method includes providing, by one or more computing devices, an image comprising a plurality of pixels to a machine-learned segmentation model comprising a plurality of heads. The plurality of heads include a first head configured to generate a truncated signed distance function initialization for an object detected in the image, wherein the truncated signed distance function initialization estimates a signed distance for a subset of pixels of the plurality of pixels to a closest pixel that is associated with an initial boundary of the object. The plurality of heads include a second head configured to output a deep object feature representation for the object, wherein the deep object feature representation comprises a feature embedding generated by mapping intensities for each pixel in the subset of pixels to a different dimensional space. The method includes generating, by the one or more computing devices, the truncated signed distance function initialization with the first head of the machine-learned segmentation model and the deep object feature representation with the second head of the machine-learned segmentation model. The method includes for at least one object detected in the image, iteratively updating, by the one or more computing devices and based at least in part on the deep object feature representation, the truncated signed distance function initialization associated with said object by performing Chan-Vese optimization over a number of iterations. The method includes determining, by the one or more computing devices, an instance segmentation mask for the image based on a final truncated signed distance function generated by updating the truncated signed distance function initialization over the number of iterations.

Another example aspect of the present disclosure is directed to a computing system that includes one or more processors and one or more non-transitory computer-readable media that collectively store: a machine-learned segmentation model comprising a region proposal network and a plurality of heads. The region proposal network processes the image to generate a plurality of regions of interest respectively associated with a plurality of candidate objects. The plurality of heads include a first head configured to generate a truncated signed distance function initialization for each region of interest, wherein the truncated signed distance function initialization for each region of interest estimates a signed distance for a subset of pixels of the plurality of pixels to a closest pixel that is associated with an initial boundary of the candidate object associated with the region of interest. The plurality of heads include a second head configured to output a deep object feature representation for each region of interest, wherein the deep object feature representation for each region of interest comprises a feature embedding generated by mapping intensities for each pixel in the region of interest of pixels to a different dimensional space. The computing system includes instructions that, when executed by the one or more processors, cause the one or more processors to perform operations. The operations include providing the image comprising the plurality of pixels to the region proposal network. The operations include receiving plurality of regions of interest as an output of the region proposal network. The operations include, for each of the regions of interest: generating the truncated signed distance function initialization with the first head of the machine-learned segmentation model and the deep object feature representation with the second head of the machine-learned segmentation model; iteratively updating, based at least in part on the deep object feature representation, the truncated signed distance function initialization associated with said object by optimizing an energy function over a number of iterations; and determining an instance segmentation mask for the candidate object based on a final truncated signed distance function generated by updating the truncated signed distance function initialization over the number of iterations.

Another example aspect of the present disclosure is directed to an autonomous vehicle. The autonomous vehicle includes a computing system comprising one or more non-transitory computer readable media collectively storing instructions that when executed by one or more processors cause the computing system to perform operations. The operations include obtaining, from one or more cameras in communication with the computing system, an image comprising a plurality of pixels. The operations include providing the image to a machine-learned segmentation model comprising a plurality of heads. The plurality of heads comprise: a first head configured to generate a truncated signed distance function initialization for an object depicted in the image, wherein the truncated signed distance function initialization estimates a signed distance for a subset of pixels of the plurality of pixels to a closest pixel that is associated with an initial boundary of the object; and a second head configured to output a deep object feature representation for the object, wherein the deep object feature representation comprises a feature embedding generated by mapping intensities for each pixel in a region of pixels to a different dimensional space. The operations include generating the truncated signed distance function initialization with the first head of the machine-learned segmentation model and the deep object feature representation with the second head of the machine-learned segmentation model. The operations include, for at least one object detected in the image: iteratively updating, based at least in part on the deep object feature representation, the truncated signed distance function initialization associated with said object by optimizing an energy function over a number of iterations. The operations include determining an instance segmentation mask for the image based on a final truncated signed distance function generated by updating the truncated signed distance function initialization over the number of iterations. The operations include modifying a control operation of the autonomous vehicle based at least in part on the instance segmentation mask, the final truncated signed distance function, or both.

Another example aspect of the present disclosure is directed to one or more non-transitory computer-readable media that collectively store instructions that when executed by one or more processors cause the one or more processors to perform operations. The operations include obtaining, from one or more cameras in communication with the computing system, an image comprising a plurality of pixels. The operations include providing the image to a machine-learned segmentation model comprising a plurality of heads. The plurality of heads include a first head configured to generate a truncated signed distance function initialization for an object depicted in the image, wherein the truncated signed distance function initialization estimates a signed distance for a subset of pixels of the plurality of pixels to a closest pixel that is associated with an initial boundary of the object, and a second head configured to output a deep object feature representation for the object, wherein the deep object feature representation comprises a feature embedding generated by mapping intensities for each pixel in a region of pixels to a different dimensional space. The operations include generating the truncated signed distance function initialization with the first head of the machine-learned segmentation model and the deep object feature representation with the second head of the machine-learned segmentation model. The operations include for at least one object detected in the image: iteratively updating, based at least in part on the deep object feature representation, the truncated signed distance function initialization associated with said object by optimizing an energy function over a number of iterations. The operations include determining an instance segmentation mask for the image based on a final truncated signed distance function generated by updating the truncated signed distance function initialization over the number of iterations. The operations include evaluating a loss function that compares the instance segmentation mask to a ground truth mask and compares the final truncated signed distance function to a ground truth truncated signed distance function target. The operations include modifying one or more values or one or more parameters of each of the first head and the second head based at least in part on the loss function Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
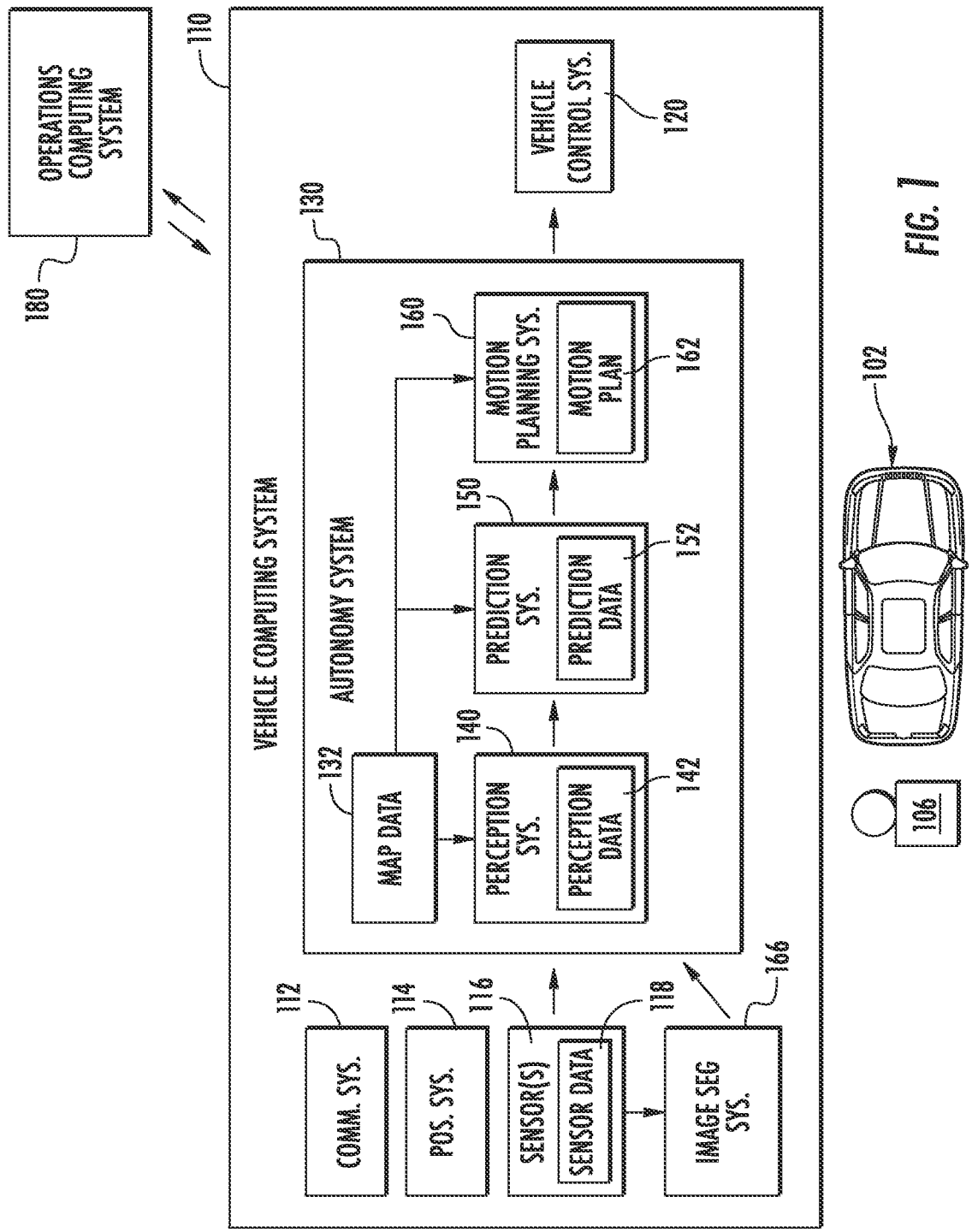
FIG. 1 illustrates an example implementation for an autonomous vehicle computing system configured to perform instance segmentation according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In general, the present disclosure is directed to computer-implemented methods and systems for performing instance segmentation that can provide improved estimation of object boundaries. In particular, aspects of the present disclosure combine the strengths of modern deep learning with the benefits of continuous energy based segmentation frameworks. In particular, rather than using models that perform only object versus background classification to segment the image, machine-learned models according to the present disclosure can be trained in a multi-task manner to predict multiple features or outputs related to objects detected in the image. As an example, a model can have multiple different heads (e.g., four) that predict different features or outputs based on an intermediate representation produced by a backbone model such as, for example, a feature pyramid network. As used herein, a head of a machine-learned model can be considered a separately trained or co-trained portion of the machine-learned model (e.g., neural network) that is configured to determine a certain output given an input to the machine-learned model or given an intermediate output generated by the machine-learned model. For instance, an example multi-headed model in accordance with the present disclosure can include one head trained to predict an initialization of a truncated signed distance function (TSDF) representing a (truncated and signed) distance from each pixel to a predicted nearest boundary of the object. As another example, another one of the heads can predict a deep object feature representation. Yet further heads can predict hyperparameters and/or classification outputs and/or bounding boxes. The truncated signed distance function can then undergo an optimization process utilizing other learned features from the image (e.g., the deep object feature representation) to generate a final TSDF that can be converted to a segmentation mask. As one example, a Chan-Vese optimization can be performed on the TSDF to output a refined segmentation mask.

As an example for illustration, consider performing instance segmentation for an image of a busy city area. The large number of objects and proximity of the objects to one another can provide challenges for identifying object boundaries and can result in grouping objects together. Real object boundaries are generally smooth and display low noise; however, this can be difficult to achieve, even when using state of the art segmentation models such as Mask R-CNN. Thus, rather than performing segmentation based on classification of pixels associated with background and pixels associated with an object, implementations according to the present disclosure are directed to identifying object boundaries using a combination of deep learning and energy-based optimization.

In particular, some example implementations in accordance with the present disclosure utilize a multi-headed machine-learned model which has been trained to predict an initial TSDF, as well as a deep object feature representation. The deep object feature representation can provide an embedded representation of the image that adjusts the dimensionality of underlying data (e.g., pixel values) to account for both global and local information. In this manner, the deep object feature representation can provide additional attributes for determining whether a pixel location is associated with the object or with the background beyond the pixel value (e.g., pixel intensity, pixel color, etc.) itself. Utilizing these initial features predicted by a machine-learned model, a second model and/or algorithm can optimize an energy function to iteratively update the initial TSDF to produce a final TSDF. The final TSDF can then be transformed to generate the segmentation mask.

Thus, an example aspect of the present disclosure includes a multi-headed machine-learned model. The multi-headed machine-learned model can be trained as a whole to allow for crossover or multi-task learning between the heads, which may improve performance for implementations that include additional heads such as a head for trained to predict the object class and/or localization or a head trained to predict numeric values associated with optimizing the initial TSDF. As an example, object localization can be used to generate a bounding box or other coordinates (e.g., an object centroid) to limit additional processing such as optimization, which may reduce computation time and/or memory resources. More particularly, the object localization (e.g., bounding box) can, in some example implementations, be used to extract the deep object feature representation and initial TSDF based solely on pixels within the bounding box. In this manner, the effect of differences in lighting, color values, or other image characteristics over the entire image may have a reduced effect, which can lead to improved segmentation masks. Further, performing segmentation for each instance of an object can allow for parallel processing for at least optimization of the energy function, since each TSDF initialization can be associated with a respective region of the image based at least in part on the object localization.

Additionally, crossover or multi-task learning between the object classification and other heads may improve determination of the deep object feature representation and/or the initial TSDF. Since the TSDF is a function of distance to the object boundary, certain object classes may have features such as curved boundaries that can improve generating an initial TSDF. Alternatively or additionally, certain objects may include features such as clear portions or patterns that could be predicted as associated with background imagery. For these objects, the deep object feature representation head may learn an improved prediction for associating these pixels with the object, rather than with background.

Aspects of the energy function can include a distance calculation for pixels associated with the object and a distance calculation for pixels associated with background. In this manner, the energy function can in some respects be considered as similar to clustering techniques such as K-Means. For example, the energy function can include a first distance term defining a distance calculation between the deep object feature representation predicted by the machine learned model and a constant (e.g., $c_1$) to denote pixels representing the object, by associating (e.g., multiplying) this difference with a first area (e.g., H) for a region of interest. The energy function can also include a second distance term defining a distance calculation between deep object feature representation predicted by the machine-learned model and a second constant (e.g., $c_2$) to denote pixels that do not represent the object (e.g., background), by associating (e.g., multiplying) this difference with the remainder of the region of interest (e.g., 1-H). Further the region of interest can be a function of the truncated signed distance function such that the region of interest (e.g., H) and the remainder of the region of interest (e.g., 1-H) can be indexed to pixels associated with the object (e.g., pixels within the TSDF and/or pixels having a positive TSDF value) or associated with background (e.g., pixels outside of the TSDF and/or pixels having a negative TSDF value).

In certain implementations the energy function may include additional terms and/or constants for weighting the effect of a term. As an example, the energy function may also include a term to encourage a smoother boundary between the region of interest and the remainder of the region of interest. Thus, generally, some example energy functions encourage two groupings of pixels (the groupings determined based on the TSDF) to independently have similar deep object feature representations. Further, the energy function can include a boundary condition (e.g., based on the TSDF and/or a derivative of the TSDF) to optimize a characteristic of the boundary (e.g., a smoothness, a linearity, etc.)

While described here using general terms, it should be understood that the energy function can include further parameters, referred to in some instances as hyperparameters, for defining the weightings of one or more terms of the energy function and/or for defining optimization terms such as a timestep for performing an optimization technique (e.g., gradient descent) and/or other modifiable characteristics of an optimization. Further, in some implementations, the hyperparameters may be determined using a separate head of the machine-learned model, which may improve model performance since different object classes may be associated with different learned hyperparameters.

Thus, an example aspect of implementations according to the present disclosure includes a multi-headed machine-learned model configured to determine one or more predicted initial attributes of an image. These initial attributes can be collectively grouped to produce an energy function that, upon optimization, can be used to extract a final TSDF for generating a segmentation mask.

For optimizing the energy function, example implementations can iteratively update one or more parameters associated with the energy function such as the current iteration of the TSDF, the first constant, and/or the second constant. For optimization, various techniques may be used to determine an optimal solution. For instance, the energy function may be defined as a fully differentiable equation over the entire image or over a subset of pixels extracted from the image. Further, the number of iterations can be determined using a machine-learned model or may be predefined.

After optimizing the energy function over the number of iterations, the current iteration of the TSDF can be taken as the final TSDF and can be used to determine the instance segmentation mask. Since the TSDF provides a signed distance for each pixel to a nearest boundary, the pixels associated with a 0 TSDF can be identified to determine the final mask. For instance, pixels associated with negative values of the TSDF can be defined as associated with the background and pixels associated with positive values of the TSDF can be defined as associated with the object. Alternatively, certain implementations may include a threshold of pixels. For instance, in some applications, it may be of importance to overestimate the boundaries of the object (e.g., to prevent collision with an object boundary). In these implementations, the generation of the final mask may include associating a subset of pixels with the object based on the final TSDF. As an example, absolute values of the final TSDF that are close to 0 (e.g., within 1-50 depending on the number of pixels and/or image resolution) may also be included, in addition to pixels associated with a positive TSDF value, to generate the segmentation mask to provide an error threshold.

In some implementations, the optimization of a deep Chan-Vese can be unrolled as a parameter-free recurrent neural network, which renders the whole model pipeline end-to-end differentiable. Thus, the proposed systems are able to obtain more precise object masks at higher resolutions that satisfy region based and geometric constraints.

One example implementation of the present disclosure includes a computer-implemented method for generating instance segmentation masks for objects depicted in images. The method can include obtaining image data (e.g., one or more image frames) comprising a plurality of pixels. The image data can be provided (e.g., input, transmitted, etc.) to a machine-learned segmentation model having a plurality of heads, each head configured to determine a separate output. For instance, the example machine-learned model can include at least two heads: a first head configured to generate a truncated signed distance function initialization for an object depicted in the image and a second head configured to generate a deep object feature representation.

As previously disclosed, the truncated signed distance function initialization can estimate a signed distance (e.g., a negative, positive, or zero numeric value) for a subset of the pixels to a closest pixel that is associated with an initial boundary of the object. Thus, the truncated signed distance function can be considered as estimating a group of pixels associated with the object boundary and calculating a distance for each pixel in the subset of pixels to the closest object boundary. For instance, each pixel in the subset of pixels may determine a distance to each pixel in the group of pixels associated with the object boundary. Then the lowest distance determined from the calculation may be used to assign the respective distance to each pixel in the subset of pixels.

The deep object feature representation can provide an embedded representation generated by mapping one or more pixel values for each pixel in the subset of pixels to a different dimensional space. Aspects of the different dimensional space can include clustering pixels such that pixels of the same instance (e.g., object or background) are closer together in the embedded space. As one example, the subset of pixels can be mapped to a higher dimensional space based on features such as pixel proximity to other pixels having similar color, intensity or other attributes of the pixel. More particularly, example machine-learned models may include one or more convolutional neural networks that can pass through the subset of pixels to extract both local and global features of the subset of pixels.

After generating the truncated signed distance function initialization and the deep object feature representation, the example implementation can iteratively update the truncated signed distance function initialization based at least in part on the deep object feature representation. In particular, the method can include optimizing an energy function over a number of iterations. The energy function can be defined to include one or more terms defining a partitioning/clustering of pixels associated with the object, pixels associated with the background or both based at least in part on the deep object feature representation. Further the energy function can base the clustering of pixels relative to the initial truncated signed distance function or a current iteration of the truncated signed distance function. Since, the TSDF provides a signed distance to the predicted object boundary, any values that are zero can be considered to represent the object boundary, thus partitioning the image into at least two regions: a first region associated with the object and a second region associated with background.

During optimization, the initial TSDF can be updated at each iteration to generate a current TSDF representing a current prediction for the object boundary. For some implementations, the energy function can include additional terms that are updated at each iteration. Thus, optimization can include a multivariate optimization of one or more parameters associated with the clustering of pixels and/or the boundary defining the region of pixels associated with the object and the region of pixels associated with the background.

The example method can generate a final TSDF after completing the iterative optimization, and the final TSDF can be used to generate the segmentation mask. As an example, the final TSDF can be used to extract pixels associated with certain distance values (e.g., positive values) using a function (e.g., the Heaviside function). These pixels can be associated with an image location (e.g., an x,y-coordinate, array position, or both) based on the image data format and the corresponding pixel values (e.g., RGB color) for the location adjusted to provide an instance segmentation mask.

Another aspect of example methods for performing instance segmentation can include an additional head (e.g., a third head) configured to generate an object localization and or an object classification for each of one or more objects detected in the image. The object localization can provide a region of pixels (e.g., the subset pixels for which the TSDF initialization is determined) that can optionally be used in part to govern outputs of the one or more heads of the machine-learned model. Similarly, the object classification can provide a label (e.g., a car, a person, a building, etc.) for each of one or more objects detected in the image. The label may also be used in part to govern outputs of the one or more heads such as determining the TSDF initialization based at least in part on the object classification.

Since, the object localization and/or classification may be used at least in part to determine the outputs of other machine-learned heads, in certain implementations, the object localization and/or classification may be determined as part of a backbone of the machine-learned model, so that the information can be generated prior to determining the output of certain heads of the machine-learned model (e.g., the TSDF initialization head and/or the deep object feature representation head).

Further, certain implementations according to the disclosure may include a machine-learned model having another head (e.g., a fourth head). The fourth head can be configured to determine one or more hyperparameters. The hyperparameters may in some instances be based at least in part on the label associated with the object. Further, as discussed, each of the one or more hyperparameters can be applied to terms of the energy function (e.g., as weights). Thus, as an example, the hyperparameters may include weights for each of the distance terms in the energy function.

In some implementations, the energy function can include at least a modified Chan-Vese level set segmentation. For Chan-Vese level set segmentation, the ground-truth pixel values (e.g., pixel intensities) are used to perform optimization. Instead, for these implementations, the modified Chan-Vese level set segmentation substitutes pixel intensity values for the deep object feature representation. The mixture of features from energy optimization models and machine-learned modes unexpectedly yields state of the art results which provide an improvement over existing segmentation models.

To further illustrate aspects of example implementations according to the disclosure, one example of defining an energy function can include:

$$E_m(\phi, c_1, c_2) = \lambda_1(r_m) \int_{\Omega_m} \|F(r_m)(x) - c_1\|^2 H(\phi(x)) dx + \qquad (8)$$

$$\lambda_2(r_m) \int_{\Omega_m} \|F(r_m)(x) - c_2\|^2 (1 - H(\phi(x))) dx +$$

$$\mu(r_m) \int_{\Omega_m} \delta_\varepsilon(\phi(x)) \|\nabla \phi(x)\| dx$$

Each of the parameters can be defined as follows: the initial TSDF $\phi_0(r_m)$, the set of hyperparameters $\{\mu(r_m), \lambda_1(r_m), \lambda_2(r_m), \varepsilon_{1:N}(r_m), \Delta t_{1:M}(r_m)\}$, and the Chan-Vese feature map $F(r_m)$. Further each of these parameters can be determined based on the region of interest ($r_m$) or as a function of $r_m$, so that the energy function $E_m$ can be optimized for each $r_m$ (e.g., each object).

Note that the integration is over the image subset $\Omega_m \subset \Omega$ corresponding to $r_m$. Alternating optimization can be performed on $\phi$ (the current TSDF) at each iteration and c1, c2. In particular, the $\phi$ update step can be performed as:

$$\phi_n = \phi_{n-1} + \Delta t_n(r_m) \frac{\partial \phi(\varepsilon_n(r_m))}{\partial t} \qquad (9)$$

for $n = 1, \ldots, N$ as a set of feedforward layers with

-continued $$\frac{\partial \phi(\varepsilon_n(r_m))}{\partial t} = \delta_{\varepsilon_n} r_{(r_m)}(\phi) \left( \mu(r_m) div\left(\frac{\nabla \phi}{\|\nabla \phi(x)\|}\right) \qquad (10)$$
$$-\lambda_1(r_m)(F(r_m) - c_1)^2$$
$$+\lambda_2(r_m)(F(r_m) - c_2)^2 \right)$$

At each update step, the constants c1 and c2 can have closed-form updates as:

$$c_1(\phi) = \frac{\int_{\Omega_m} F(r_m)(x) H(\phi(x)) dx}{\int_{\Omega_m} H(\phi(x)) dx} \qquad (11)$$

$$c_2(\phi) = \frac{\int_{\Omega_m} F(r_m)(x)(1 - H(\phi(x))) dx}{\int_{\Omega_m} (1 - H(\phi(x))) dx}$$

As one example learning method, a multi-headed machine-learned model can be trained jointly in an end-to-end manner as the Mask R-CNN backbone, the three extra heads (initial TSDF, hyperparameters, and deep learned features), and the deep Chan-Vese recurrent network can be defined to be fully differentiable. In particular, the standard regression and cross-entropy losses for the bounding box and classification components of both the region proposal network (RPN) and the detection/classification heads of the backbone. For training the TSDF outputs of the initial TSDF head and the deep Chan-Vese system, the following example loss can be applied which is a mix of $l_1$ and binary cross-entropy (BCE):

$$\ell_{tsdf}(\phi, \phi_{GT}, M_{GT}) = \|\phi - \phi_{GT}\|_1 + BCE(H_\varepsilon(\phi), M_{GT}) \qquad (12)$$

While certain aspects are described herein as computer implemented methods, it should be understood that the present disclosure also include computing systems and/or computer readable media that collectively store or can communicate instructions that when executed by a computer processor can cause the processor to perform one or more operations as disclosed in methods herein.

Further, example computer-implemented methods and systems may be used in a variety of computer-vision applications including by not limited to self-driving or autonomous vehicles. For instance, an example implementation according to the present disclosure can include an autonomous vehicle having a computing system configured to provide one or more outputs for modifying a control operation of the vehicle. The computing system can include one or more non-transitory computer-readable media for performing instance segmentation using a machine-learned segmentation model according to example methods disclosed herein. Based at least in part on outputs of the machine-learned segmentation model (e.g., a final TSDF, a segmentation mas, an object localization, etc.) the vehicle can determine an adjustment (e.g., applying the brakes to reduce speed, adjusting the steering to change direction, adjusting engine performance to increase speed, activating one or more signals on a driver interface of the vehicle, etc.) to modify operation of the vehicle, in lieu of receiving a human input.

Example implementations in accordance with the present disclosure can be used to generate a variety of outputs. For instance, the final TSDF can be used to create a modified image by adjusting the pixel values associated with a zero TSDF value or having an absolute value less than a threshold number of pixels. In this manner, an estimated boundary of the object can be extracted. Additionally, the threshold boundary can be combined with additional sensor information such as LIDAR, RADAR, or similar detectors to map the pixel values to physical distances. In this manner, example machine-learned segmentation model outputs can be mapped to physical values for determining an adjustment to mechanical components in manufacturing and/or driving applications.

With reference now to the figures, example embodiments of the present disclosure will be discussed in further detail.

FIG. 1 illustrates an example vehicle computing system 110 according to example embodiments of the present disclosure. The vehicle computing system 110 can be associated with a vehicle 102. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 105 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 105. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 100 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102. For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for generating image segmentation masks and/or generating other outputs using example machine-learned models disclosed herein such as the final TSDF, object localizations, etc.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 100 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

As shown in FIG. 1, the vehicle computing system 110 can include an image segmentation system 166 that is configured to generate a segmentation mask based at least in part on receiving imagery of an area including one or more objects (e.g., people, cares, buildings, animals, etc.) The image segmentation system 166 can include one or more machine-learned models configured to process image data defined by a plurality of pixels. For example, the machine learned model(s) can be configured to receive or otherwise obtain information from the sensor(s) 116 such as one or more images each including a plurality of pixels. The machine-learned image segmentation model can utilize multiple heads to extract local and global features of the images to generate an initial prediction of a boundary for one or more objects identified in the image. The initial boundary can be determined based on an initial truncated signed distance function (TSDF). Additionally, the model can include heads for extracting features from the data to optimize the initial TSDF to better refine the predicted boundary. Repeating this process for each object identified in the image can be used to identify the pixels associated with a certain object and pixels associated with background. Further, this information may be combined with other sensor data such as LIDAR or RADAR to determine distances associated with one or more of the objects. In particular, certain implementations may use the image segmentation system 164 to determine outputs that can be used at least in part by autonomous vehicle 102 to modify the autonomy system 130 of the vehicle 102 and determine an adjustment to the vehicle control system(s) 120.

Although many examples are described herein with respect to autonomous vehicles, the disclosed technology is not limited to autonomous vehicles. In fact, any object capable of collecting or processing sensor data such as image data that contained one or more objects can utilize the technology described herein for generating a segmentation mask. For example, a non-autonomous vehicle may utilize aspects of the present disclosure to generate a target trajectory for an operator of the non-autonomous vehicle, notify the vehicle operator of the target trajectory, and take precautionary measures based on the identified target trajectory. Likewise, a smart phone with one or more cameras, a robot, augmented reality system, and/or another type of system can utilize aspects of the present disclosure to generate target trajectories.

Figure 2:
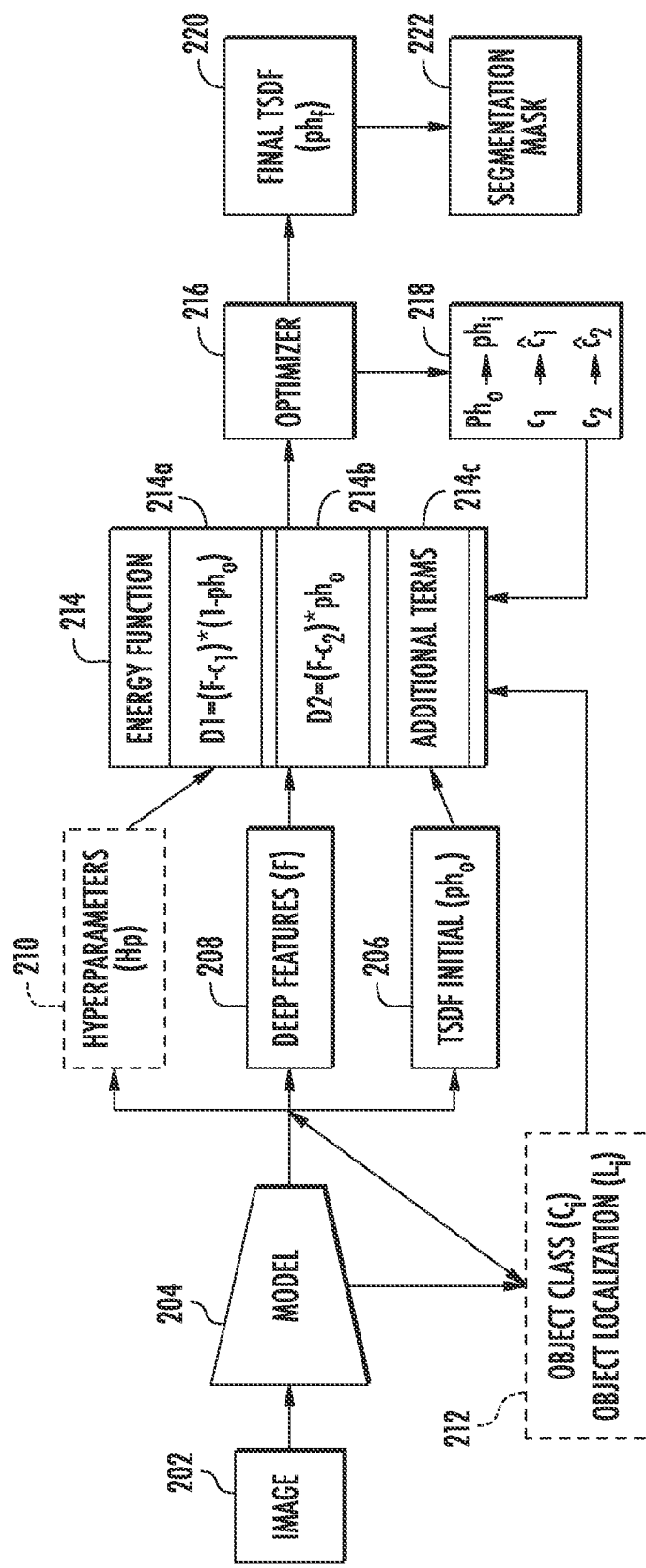
FIG. 2 illustrates flow diagram of an example implementation for generating a segmentation mask according to example embodiments of the present disclosure.

FIG. 2 depicts an example architecture as well as example process flows for an example machine-learned segmentation model according to the present disclosure. As illustrated, an example segmentation model 204 can be configured (e.g., trained) to take an image 202 comprising a plurality of pixels as an input. Based on the image 202, the model 204 can determine various outputs such as a TSDF initial 206, deep features 208, and, in some implementations, hyperparameters 210 and/or object class and localization 212. Each of these outputs can be used to define an energy function 214 such as a modified Chan-Vese function that includes terms for grouping pixels as associated with an object or background based on a current iteration of the TSDF.

As illustrated, one example aspect of certain energy functions can include at least two distance terms for grouping attributes of pixels associated with the object and pixels associated with background. More particularly, the energy function can include a first distance term (D1) 214a defining a distance calculation between the deep object feature representation predicted by the machine learned model (F) and a constant (e.g., $c_1$) to denote pixels representing the object, by associating (e.g., multiplying) this difference with a first area (e.g., 1–ph$_0$) for a region of interest. The energy function can also include a second distance term (D1) 214b defining a distance calculation between deep object feature representation predicted by the machine-learned model (F) and a second constant (e.g., $c_2$) to denote pixels that do not represent the object (e.g., background), by associating (e.g., multiplying) this difference with the remainder of the region of interest (e.g., ph$_0$). Since the TSDF can be used to determine a predicted object boundary, the region of interest can be determined based at least in part on the truncated signed distance function (ph$_0$) such that the region of interest and the remainder of the region of interest can be indexed to pixels associated with the object (e.g., pixels within the TSDF and/or pixels having a positive TSDF value) or associated with background (e.g., pixels outside of the TSDF and/or pixels having a negative TSDF value). In some implementations, the energy function can include additional terms 214c such as a smoothness term based on the gradient of the TSDF.

The energy function can be optimized using an optimizer 216 to determine updated parameters 218 of the energy function 214. For example, the initial TSDF (Pho) can be updated over a number of iterations to determine a current TSDF (Phi, where i denotes the iteration number). As another example, the grouping constants $c_1$ and $c_2$ can also be updated at each iteration to improve the features clustering relative to the deep features determined by the machine-learned segmentation model. In some implementations the optimizer 216 can be configured as a parameter-free recurrent neural network. After optimization over the number of iterations, the current TSDF is considered the final TSDF 220 and can be used to extract the boundary of the object(s) to determine a segmentation mask 222 for the image.

To further illustrate aspects of example implementations according to the disclosure, one example energy function 214 can include:

$$E_m(\phi, c_1, c_2) = \lambda_1(r_m) \int_{\Omega_m} \|F(r_m)(x) - c_1\|^2 H(\phi(x)) dx + \qquad (8)$$

$$\lambda_2(r_m) \int_{\Omega_m} \|F(r_m)(x) - c_2\|^2 (1 - H(\phi(x))) dx +$$

$$\mu(r_m) \int_{\Omega_m} \delta_\varepsilon(\phi(x)) \|\nabla \phi(x)\| dx$$

Each of the parameters can be defined as follows: the initial TSDF $\phi_0(r_m)$, the set of hyperparameters $\{\mu(r_m), \lambda_1(r_m), \lambda_2(r_m), \varepsilon_{1:N}(r_m), \Delta t_{1:M}(r_m)\}$, and the Chan-Vese feature map $F(r_m)$. Further each of these parameters can be determined based on the region of interest ($r_m$) or as a function of $r_m$, so that the energy function $E_m$ can be optimized for each $r_m$ (e.g., each object).

Note that the integration is over the image subset $\Omega_m \subset \Omega$ corresponding to $r_m$. Alternating optimization can be performed on $\phi$ (the current TSDF) at each iteration and c1, c2. In particular, the $\phi$ update step can be performed as:

$$\phi_n = \phi_{n-1} + \Delta t_n(r_m) \frac{\partial \phi(\varepsilon_n(r_m))}{\partial t} \qquad (9)$$

for $n = 1, \ldots, N$ as a set of feedforward layers with $$\frac{\partial \phi(\varepsilon_n(r_m))}{\partial t} = \delta_{\varepsilon_n} r_{(r_m)}(\phi) \left( \mu(r_m) div\left( \frac{\nabla \phi}{\|\nabla \phi(x)\|} \right) \right) \qquad (10)$$

$$- \lambda_1(r_m)(F(r_m) - c_1)^2$$

$$+ \lambda_2(r_m)(F(r_m) - c_2)^2 \Big)$$

At each update step, the constants c1 and c2 can have closed-form updates as:

$$c_1(\phi) = \frac{\int_{\Omega_m} F(r_m)(x) H(\phi(x)) dx}{\int_{\Omega_m} H(\phi(x)) dx} \qquad (11)$$

$$c_2(\phi) = \frac{\int_{\Omega_m} F(r_m)(x)(1 - H(\phi(x))) dx}{\int_{\Omega_m} (1 - H(\phi(x))) dx}$$

As one example learning method, the multi-headed machine-learned model can be trained jointly in an end-to-end manner as the Mask R-CNN backbone of model 204, the three extra heads (initial TSDF 206, hyperparameters 210, and deep learned features 208), and the deep Chan-Vese recurrent network 216 can be defined to be fully differentiable. In particular, the standard regression and cross-entropy losses for the bounding box and classification components of both the RPN and the detection/classification heads of the backbone portion of the model 204. For training, the TSDF outputs of the initial TSDF head 206 and the deep Chan-Vese system, the following example loss can be applied which is a mix of l1 and binary cross-entropy BCE:

$$\ell_{tsdf}(\phi, \phi_{GT}, M_{GT}) = \|\phi - \phi_{GT}\|_1 + BCE(H_\varepsilon(\phi), M_{GT}) \qquad (12)$$

Figure 3:
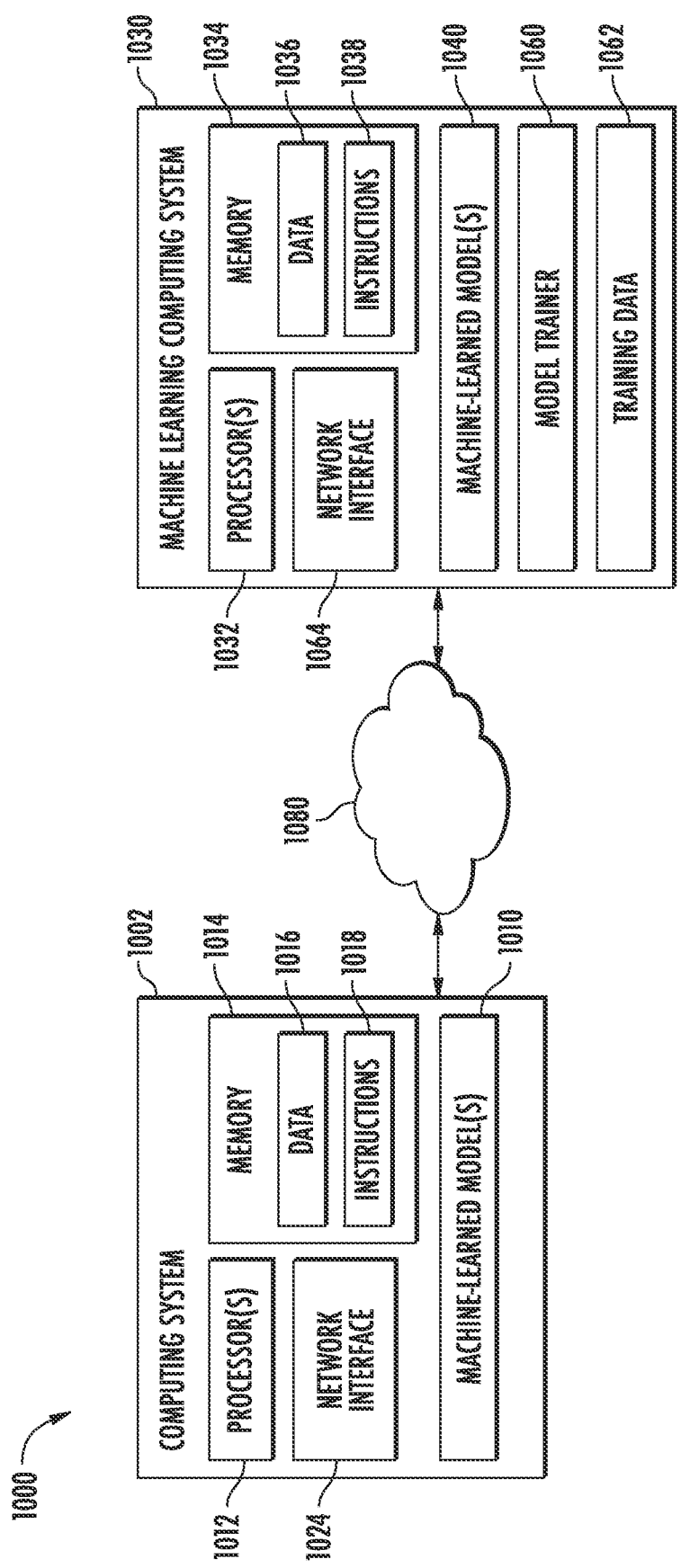
FIG. 3 illustrates an example computing system for performing instance segmentation using one or more machine-learned models according to example embodiments of the present disclosure.

FIG. 3 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can be located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 3 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 4:
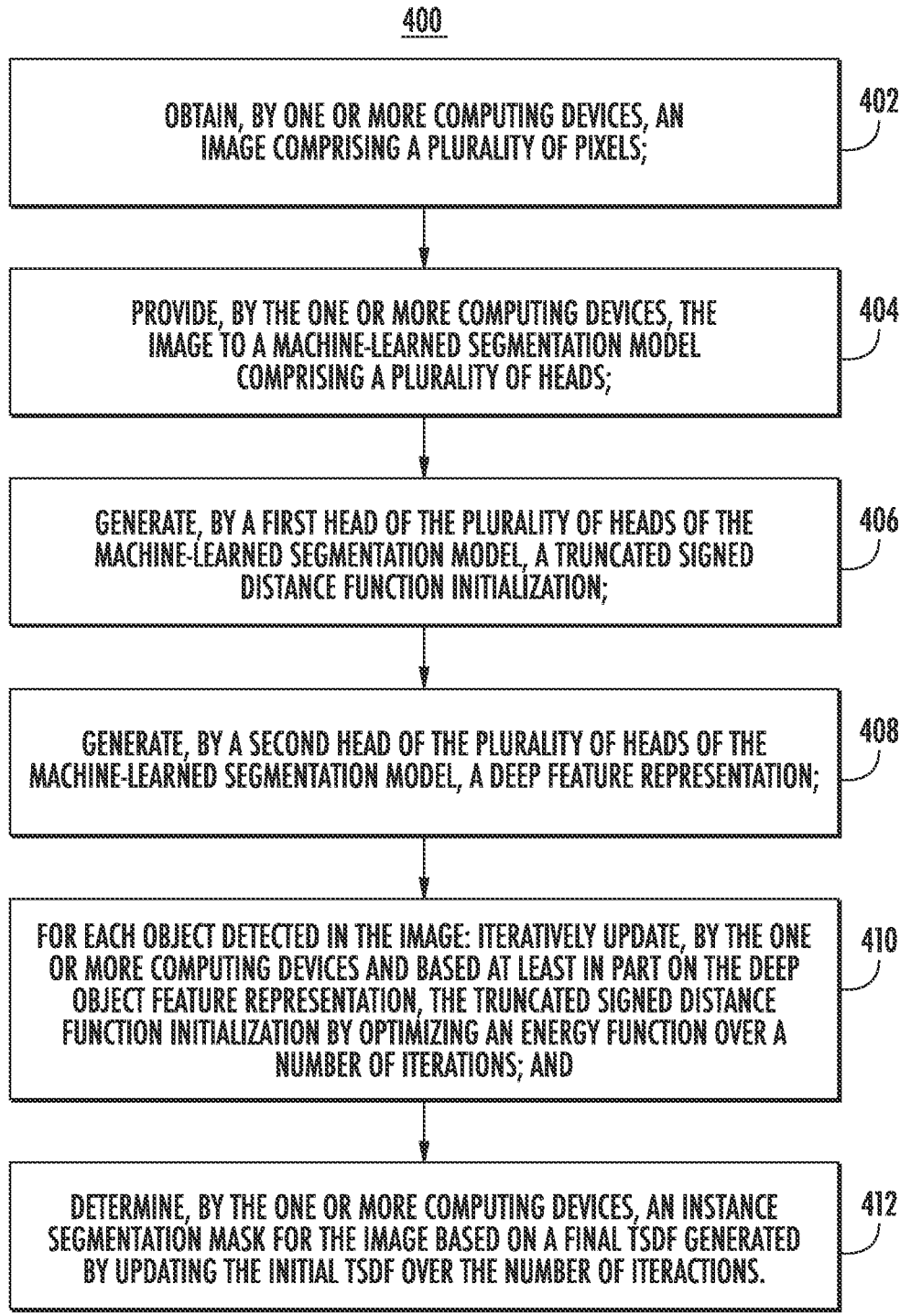
FIG. 4 illustrates a process flow diagram showing an example method for generating a segmentation mask according to example embodiments of the present disclosure.

FIG. 4 depicts a flowchart illustrating an example method 400 for generating a segmentation mask using a machine-learned image segmentation model according to example embodiments of the present disclosure. One or more portions of method 400 (and the other methods disclosed herein) can be implemented by one or more computing devices such as, for example, one or more computing devices of vehicle computing system 100 of FIG. 1. One or more portions of method 400 can be implemented as an algorithm on the hardware components of the devices described herein (e.g., as in FIGS. 1, 3, and/or 5) to, for example, generate image segmentation masks. In example embodiments, method 400 may be performed by an image segmentation system 166 implemented using one or more computing devices of a vehicle computing system (e.g., 110).

At 402, method 400 can include obtaining image data such as an image comprising a plurality of pixels. For example, the image data can include sensor data such as a video camera that can obtain and transmit video data comprising a sequence of image frames in substantially real time. Alternatively or additionally, the image data may include stored data such as video or image frames stored locally or remotely as part of computing system memory. Thus, obtaining the image can also include accessing system files over a network such as a local area network or using a remote communications protocol.

At 404, method 400 can include providing (e.g., inputting) the image data to a machine-learned segmentation model comprising a plurality of heads, each head configured to determine a different output for a given input(s).

At 406, method 400 can include generating, by a first head of one of the heads of the machine-learned segmentation model, a truncated signed distance function initialization.

At 408, method 400 can include generating, by a second head of one of the heads of the machine-learned segmentation model, a deep feature representation.

At 410, method 400 can include updating, based at least in part on the deep object feature representation, the truncated signed distance function (TSDF) initialization by optimizing an energy function over a number of iterations. For example, in certain methods the machine-learned segmentation model can be configured to identify multiple objects present in the image data. Example implementations can include iteratively updating the TSDF initialization determined for each object detected in the image. In this manner, example implementations can determine a final TSDF for each object and each of these final TSDFs can be collected to generate an instance segmentation mask for the entire image.

At 412, method 400 can include determining an instance segmentation mask for the image based on a final TSDF generated by updating the initial TSDF over the number of iterations. For example, the final TSDF can be used to extract the boundary of the object for assigning pixels as associated with the object or associated with background. Thus, the final TSDF can be used to determine labels for pixels that can be used to create a mask.

Figure 5:
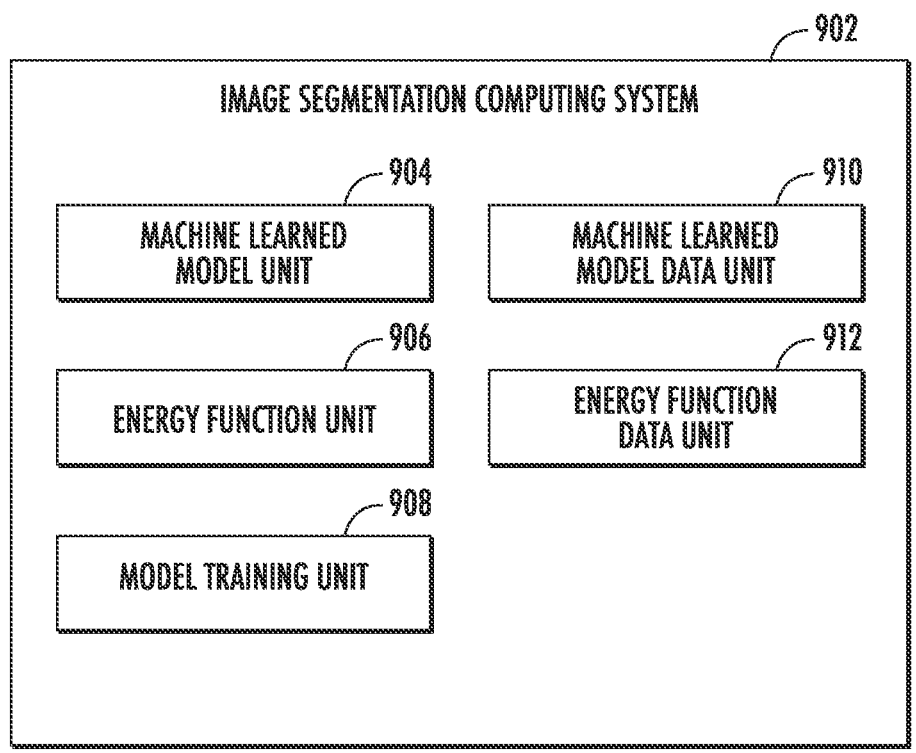
FIG. 5 illustrates an example image segmentation computing system according to example embodiments of the present disclosure.

Various means can be configured to perform the methods and processes described herein. FIG. 5 depicts an example of a computing environment including example means for performing the methods and processes described herein.

More particularly, FIG. 5 depicts an example image segmentation computing system 902 with units 904-912 for performing operations and functions according to example embodiments of the present disclosure. For example, image segmentation computing system 900 can include one or more machine-learned model unit(s) 904, one or more energy function unit(s) 906, one or more model training unit(s) 908, one or more machine-learned model data unit(s) 910, one or more energy function data unit(s) 912, and/or other means for performing the operations and functions described herein. In some implementations, one or more of the units 904-912 may be implemented separately. In some implementations, one or more of the units 904-912 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 400 and/or other operations described herein, as well as variants that may be learned though practice, can be implemented as such algorithm(s).

The means can be configured to obtain sensor data such as image data (e.g. from one or more image sensors such as cameras, etc.), LIDAR point cloud data associated with an environment external to an autonomous vehicle, RADAR data, etc. The means can be configured to obtain image data from one or more sensors. A machine-learned model data unit 904 is one example of a means for obtaining sensor data such as image and/or video data as described herein.

The means can be configured to process the image data for example by providing the image to a machine-learned segmentation model. The means can be configured to generate a truncated signed distance function initialization, a deep feature representation, and/or other outputs of multi-headed machine-learned models according to the present disclosure. A machine-learned model unit 904 is one example of a means for determining model outputs. These model outputs can be used at least in part by the energy function unit 906, which is one example of a means for updating the output(s) of the machine-learned model to generate the final TSDF and/or the segmentation mask. For some implementations, the means for the machine-learned model unit 904 and the energy function unit 906 may be combined into a single means.

The means can be configured to train the machine-learned image segmentation model end-to-end to minimize an objective function. A model training unit 912 is one example of a means for training the machine learned image compression model. The model training unit 912 can include data and/or instructions for performing supervised, semi-supervised, and/or unsupervised learning tasks.

Figure 6:
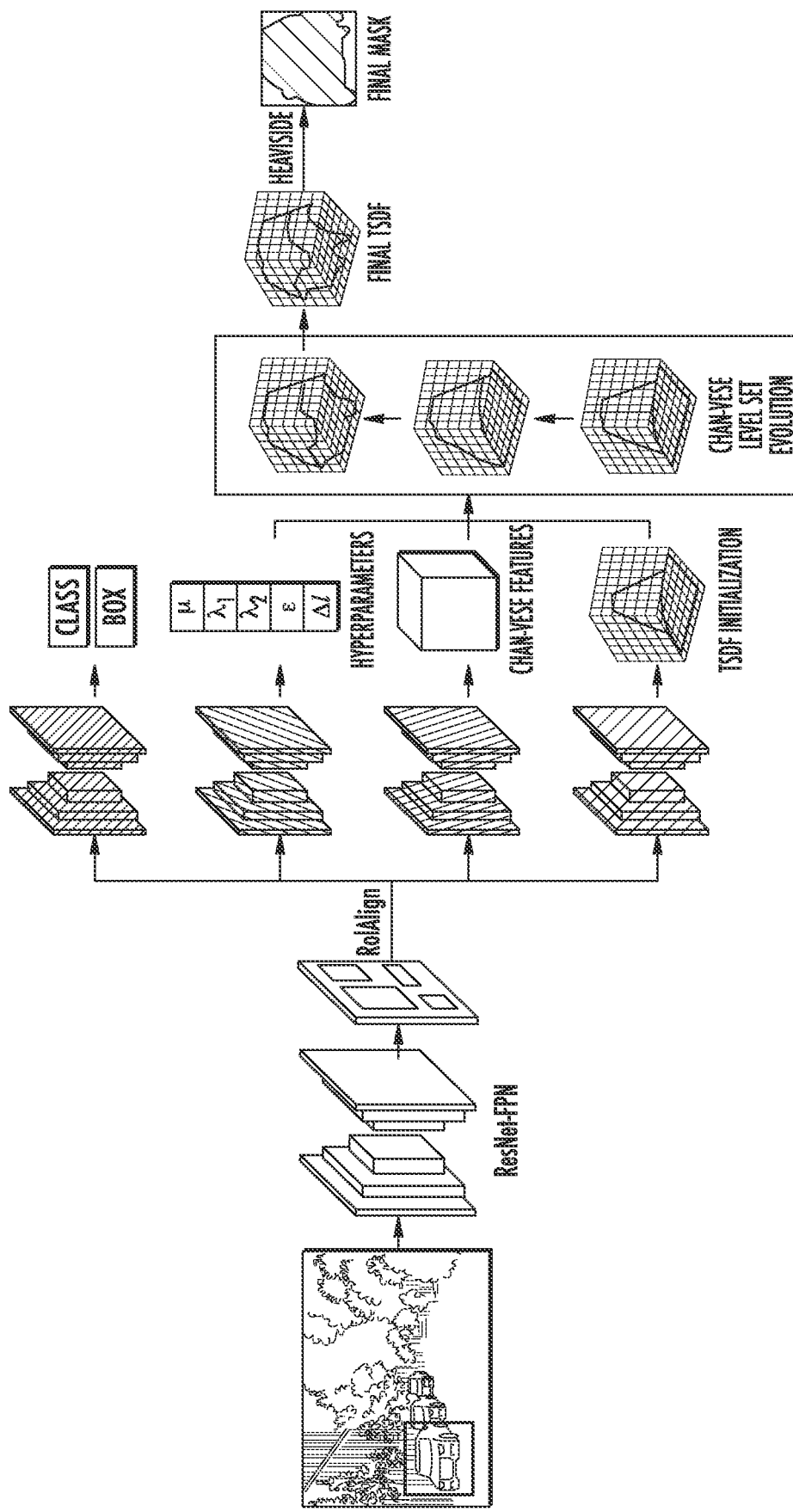
FIG. 6 illustrates an example architecture and dataflow for generating a segmentation mask that uses a region proposal network and Chan-Vese evolution.

As an example for illustration, FIG. 6 depicts an example architecture and data flow for an example machine-learned segmentation model. Four different heads can be configured to receive image data or an intermediate representation of image data determined by a region proposal network backbone (e.g., a Feature Pyramid Network—FPN such as a ResNet-FPN) to output object localization/classification results, a truncated signed distance function (TSDF), a set of object-aware energy hyperparameters, and a deep object feature representation. These intermediate outputs are then passed into the Chan-Vese system to output a further refined mask.

In some implementations, to generate regions of interest in which candidate objects are located, the region proposal network (RPN) can slide over a convolutional feature map that is the output by a last convolutional layer of a convolutional neural network. In some implementations, the RPN has a classifier and a regressor and can use anchors. An anchor is the central point of the sliding window. The classifier can determine the probability of a proposal having the target object. The regressor can regress the coordinates of the proposals. In some implementations, the RPN can be pre-trained and then, optionally, retrained as part of the illustrated architecture.

For each detection, the corresponding region of interest (RoI) can be fed to a respective series of convolutions to obtain a truncated signed distance function (TSDF) initialization, a deep feature tensor, and a set of hyperparameters.

These in turn can be input to an energy function optimization procedure (e.g., one based on Chan-Vese intensity optimization) which outputs a final TSDF.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
    obtaining an image comprising a plurality of pixels;
    generating, using a first portion of a machine-learned segmentation model, an initial distance function indicative of a distance of a respective pixel, of the plurality of pixels, to a predicted nearest boundary of an object depicted in the image;
    generating, using a second portion of the machine-learned segmentation model, an object feature representation that comprises a feature embedding for the image;
    determining, using an energy function, a final distance function based on the initial distance function and the object feature representation,
    wherein the final distance function indicates that the respective pixel is associated with a background of the image or that the respective pixel is associated with the object depicted in the image; and
    determining an instance segmentation mask for the image based on the final distance function.

2. The computer-implemented method of claim 1, wherein generating the initial distance function indicative of the distance of the respective pixel comprises generating a truncated signed distance function initialization that estimates a signed distance for the respective pixel to another pixel that is associated with the predicted nearest boundary of the object depicted in the image.

3. The computer-implemented method of claim 2, further comprising:
    iteratively updating, based on the feature representation, the truncated signed distance function initialization associated with the object.

4. The computer-implemented method of claim 3, wherein iteratively updating the truncated signed distance function initialization comprises providing the truncated signed distance function initialization and the object feature representation to a recurrent neural network.

5. The computer-implemented method of claim 1, wherein generating the object feature representation comprises generating the feature embedding based on an intensity of the respective pixel.

6. The computer-implemented method of claim 1, further comprising:
    identifying, based on the instance segmentation mask, a region of pixels included in the plurality of pixels that are associated with the object.

7. The computer-implemented method of claim 1, further comprising:
    determining, using a third portion of the machine-learned segmentation model, a label for the object depicted in the image.

8. The computer-implemented method of claim 7, wherein the label is indicative of a type of the object.

9. A computing system comprising:
    one or more processors; and
    one or more non-transitory computer-readable media that store instructions that are executable by one or more processors to cause the one or more processors to perform operations comprising:
        obtaining an image comprising a plurality of pixels;
        generating, using a first portion of a machine-learned segmentation model, an initial distance function indicative of a distance of a respective pixel, of the plurality of pixels, to a predicted nearest boundary of an object depicted in the image;
        generating, using a second portion of the machine-learned segmentation model, an object feature representation that comprises a feature embedding for the image;
        determining, using an energy function, a final distance function based on the initial distance function and the object feature representation,
        wherein the final distance function indicates that the respective pixel is associated with a background of the image or that the respective pixel is associated with the object depicted in the image; and
        determining an instance segmentation mask for the image based on the final distance function.

10. The computing system of claim 9, wherein the initial distance function comprises a signed distance function initialization.

11. The computing system of claim 10, wherein the signed distance function initialization estimates a signed distance for the respective pixel to another pixel that is associated with the predicted nearest boundary of the object depicted in the image.

12. The computing system of claim 9, further comprising:
    iteratively updating the initial distance function associated with the object based on the feature representation.

13. The computing system of claim 9, wherein the first portion of the machine-learned segmentation model comprises a first head configured to generate the initial distance function for the object depicted in the image, and the second portion of the machine-learned segmentation model comprises a second head configured to output the object feature representation comprising the feature embedding.

14. The computing system of claim 13, wherein the machine-learned segmentation model comprises a third portion, the third portion comprising a third head configured to classify and localize the object.

15. The computing system of claim 9, wherein the image is obtained through a sensor of an autonomous vehicle and wherein the object is within a surrounding environment of the autonomous vehicle.

16. The computing system of claim 15, wherein the autonomous vehicle is an autonomous truck.

17. An autonomous vehicle comprising:
    one or more processors; and
    one or more non-transitory computer-readable media that store instructions that are executable by one or more processors to cause the one or more processors to perform operations comprising:
        obtaining sensor data comprising a plurality of pixels;
        generating, using a first portion of a machine-learned segmentation model, an initial distance function indicative of a distance of a respective pixel, of the plurality of pixels, to a predicted nearest boundary of an object depicted in the sensor data, wherein the object is within a surrounding environment of the autonomous vehicle;

generating, using a second portion of the machine-learned segmentation model, an object feature representation that comprises a feature embedding for the sensor data;

determining, using an energy function, a final distance function based on the initial distance function and the object feature representation, wherein the final distance function indicates that the respective pixel is associated with a background of the sensor data or that the respective pixel is associated with the object depicted in the sensor data; and determining an instance segmentation mask for the sensor data based on the final distance function.

18. The autonomous vehicle of claim 17, wherein the operations further comprise:

identifying, based on the instance segmentation mask, a type of the object depicted in the image.

19. The autonomous vehicle of claim 17, wherein the operations further comprise:

determining a motion trajectory for the autonomous vehicle based on the object depicted in the image.

20. The autonomous vehicle of claim 17, wherein the sensor data comprises an image obtained through a camera located onboard the autonomous vehicle.

* * * * *